even Patent [19]

United States Patent [19]

Donovan et al.

[11] Patent Number: 5,690,459
[45] Date of Patent: Nov. 25, 1997

[54] PLATE AND RIVETED STUD ASSEMBLY

[75] Inventors: Steve Donovan, Roscoe; Frank Buchmann, Rockford, both of Ill.

[73] Assignee: Textron Inc., Providence, R.I.

[21] Appl. No.: 654,629

[22] Filed: May 29, 1996

[51] Int. Cl.⁶ ............................... F16B 7/00; F16B 19/06
[52] U.S. Cl. .................... 411/504; 29/509; 29/524.1; 403/274; 403/359
[58] Field of Search ........................ 411/383, 396, 411/400, 401, 504; 403/186, 274, 279, 281, 359; 29/505, 509, 524.1

[56] References Cited

U.S. PATENT DOCUMENTS

| | | | |
|---|---|---|---|
| 1,511,822 | 10/1924 | Belcher | 29/509 |
| 1,609,118 | 11/1926 | Hardy | 29/509 |
| 1,989,149 | 1/1935 | Pennock | 403/186 |
| 2,194,458 | 3/1940 | Eckler | 411/504 |
| 2,196,144 | 4/1940 | Eckler | 411/504 |
| 2,306,389 | 12/1942 | Jorgensen | 403/274 |
| 2,991,858 | 7/1961 | Taylor et al. | 411/504 |
| 3,584,667 | 6/1971 | Reiland . | |
| 3,924,317 | 12/1975 | Becker | 29/524.1 |
| 3,999,274 | 12/1976 | Butler | 29/509 |
| 4,098,096 | 7/1978 | Chard et al. | 403/359 |
| 4,924,584 | 5/1990 | Harney | 29/509 |
| 4,974,274 | 12/1990 | Compton et al. . | |
| 5,092,723 | 3/1992 | Compton et al. . | |
| 5,207,132 | 5/1993 | Goss et al. . | |
| 5,407,310 | 4/1995 | Kassouni | 411/396 |

OTHER PUBLICATIONS

Article entitled "Riveting without strain" reprinted from Tooling & Production Magazine, date unknown.

*Primary Examiner*—Rodney M. Lindsey
*Assistant Examiner*—Robert G. Santos
*Attorney, Agent, or Firm*—Trexler, Bushnell, Giangiorgi & Blackstone, Ltd.

[57] ABSTRACT

An assembly for forming a joint includes a stud joined to a plate. The stud includes a shank portion and a stem portion which extends from one end of the shank portion. The stem portion has a multi-lobular configuration thereon which is formed from a plurality of rounded lobes, each pair of lobes being interconnected to each other by a rounded flute. The plate has an aperture therethrough which has a multi-lobular configuration thereon which corresponds in shape to the multi-lobular configuration of the stem portion. To form the joint, the stem portion is inserted through the aperture such that a portion of the stem portion extends beyond the upper surface of the plate. The extending portion is then riveted to the plate to cause the extending portion to deform and uniformly expand to form a bloom or head and to secure the stud to the plate. The stem portion expands within the aperture to fully fill the aperture when the extending portion is being deformed. The extending portion can be riveted to the plate by orbital riveting, by radial riveting or by direct blow riveting.

18 Claims, 2 Drawing Sheets

PLATE AND RIVETED STUD ASSEMBLY

BACKGROUND OF THE INVENTION

This invention is generally directed to an assembly having a stud riveted to a plate to form a joint or connection. The stud has a stem portion of a multi-lobular configuration which is secured through an aperture in a plate by riveting, wherein the aperture has a corresponding shape to the multi-lobular configuration of the stem portion. The multi-lobular stem portion of the stud is placed into the multi-lobular aperture and then is riveted, such as by direct blow, radial or orbital riveting, to secure the stud to the plate. More particularly, the invention contemplates a need to secure a stud to a plate and to provide superior performance versus staking studs or existing radially riveted designs.

Currently, high performance radially or orbitally riveted joints utilize a double-D configuration 10 as shown in the drawings, which is formed from arcuate end surfaces 12 joined to each other by flat surfaces 14. A stud formed from a shank portion and a stem portion extending from one end thereof is inserted into and through an aperture in a plate, such that a portion of the stem portion extends beyond the top of the plate. Both the stem portion and the aperture are shaped in the form of the double-D configuration 10. Thereafter, the extending portion of the stud is riveted to the plate by a suitable technique, such as direct blow, radial or orbital riveting, to deform the extending portion and form a bloom or head. The performance required for the joint is high pullout force, high pushout force, high torsional resistance, and long fatigue life.

One of the problems with the double-D configuration 10 is that the radial deformation of the stud head is not even or uniform due to the flat surfaces. The resulting bloom or head that is formed after the riveting is not completely circular or uniform in nature. As a result, there are different tolerances between the engagement of the stem portion of the stud and the aperture in the plate with respect to the flat surfaces and the arcuate surfaces of the stem portion. The flat surfaces have the closest tolerance between the stem portion and the surfaces of the aperture, whereas on the arcuate surfaces the tolerance are not as close.

Another prior art configuration is provided in U.S. Pat. Nos. 4,974,274 and 5,092,723 (the latter being a divisional of the former) which discloses an engine clip and bolt assembly formed from a bolt secured to a clip. A cylindrical boss on the bolt is inserted into a scalloped aperture in the clip and then secured thereto by orbitally swaging the boss. The aperture has lands that fall on a diameter of a common circle, the diameter being slightly larger than the diameter of the unswaged boss of the bolt. The scalloped configuration is defined by a plurality of regularly spaced recesses open into the aperture at the circumference of the circle the lands fall onto. These recesses provide void volumes to receive material from the boss when it is orbitally swaged. The boss material moves radially into the recesses to provide a rotational, mechanical interference lock between the clip and the bolt. Swaged material from the boss also expands above the clip to provide an external cylindrical flange that bears against the clip and compressively holds the clip and the bolt together.

One problem with this type of design is that sharp corners are provided because of the shape of the aperture in the clip. The sharp corners can produce stress risers which causes a tendency to split the clip or to fracture the bolt.

In addition, the bolt is initially cylindrical in shape and in order to provide the interference fit between the bolt and the clip, the material from the boss must flow or expand into the recesses. If there is insufficient material movement from the boss into the recesses, gaps can form between the boss and the edges of the aperture. Thus, there is no assurance that the scalloped aperture will be completely filled during orbital riveting. Indeed it appears that the '274 and the '723 patents rely upon heating of the boss in this regard. Any residual gaps can lead to structural problems in the engine clip bolt.

The present invention is intended to present an improvement to these types of designs and to provide other advantages which will become apparent upon a reading of the attached specification and from an inspection of the drawings.

OBJECTS AND SUMMARY OF THE INVENTION

A general object of the present invention is to provide an assembly formed from a stud having a stem portion of a multi-lobular configuration which is secured through an aperture in a plate by riveting, wherein the aperture has a corresponding shape to the multi-lobular configuration of the stem portion.

Another general object of the present invention is to provide for even expansion of the stud with respect to the aperture by a uniform and controlled radial displacement of material during riveting, and wherein the result is achieved without the annealing or heating of the stem portion prior to riveting which may compromise the strength of the resulting joint.

A further object of the present invention is to provide a stud having a multi-lobular configuration thereon which is secured to a plate having an aperture therethrough of a like multi-lobular configuration which interconnection thereof provides optimized pushout and pullout resistance versus other configurations.

Yet a further object of the present invention is to provide a stud which is secured to a plate wherein the likelihood of a gap occurring between the between the stem portion of the stud and the surfaces of the aperture in the plate is reduced after riveting because of the controlled material flow with the multi-lobular configurations of the stem portion and the aperture.

A further object of the present invention is to provide a connection between a stud and a plate which has a longer fatigue life than prior configurations because of more uniform and lower contact stresses around the interconnection because of greater contact area between the stud and the plate.

An even further object of the present invention is to provide mating multi-lobular configurations for the stud and plate which provide a reduction in splitting forces in the plate because of uniform material flow and the avoidance sharp corners in the multi-lobular configurations.

Yet an even further object of the present invention is to provide an interconnection between a stud and a plate which provides greater torsional strength than prior art designs.

A specific object of the present invention is to provide an interconnection between a stud and a plate which has less tendency to produce a crack with increasing hardness level.

Briefly, and in accordance with the foregoing, the present invention discloses an assembly for forming a joint. The assembly includes a stud joined to a plate by riveting.

The stud is formed from a shank portion and a stem portion which extends from one end of the shank portion. The stem portion has a multi-lobular configuration thereon which is formed from a plurality of rounded lobes, each pair of lobes being interconnected to each other by a rounded flute.

A collar may be provided between the shank portion and the stem portion of the stud. The shank portion and said stem portion each have a predetermined diameter and the collar has a diameter greater than the diameters of the shank and stem portions such that when the stem portion of the stud is inserted through the aperture in the plate, an underside of the plate contacts and rests on the collar. If a collar is not provided, the underside of the plate contacts and rests on a shoulder provided by the shank portion of the stud.

The plate has an aperture therethrough which has a multi-lobular configuration which corresponds in shape to the multi-lobular configuration of the stem portion and is slightly larger than the stem portion. The plate may be of a variety of shapes and forms.

To form the joint, the stem portion is inserted through the aperture such that a portion of the stem portion extends beyond the upper surface of the plate. The extending portion is then riveted to the plate to cause the extending portion to uniformly expand to form a bloom or head. This secures the stud to the plate and the plate is compressively held between the head and the shank portion of the stud. The stem portion expands within the aperture to fully fill the aperture when the extending portion is deformed. The extending portion can be sufficiently deformed by orbital riveting, by radial riveting or by direct blow riveting, without the need for annealing or heating the stem portion, which may compromise the strength of the resulting joint.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 1:
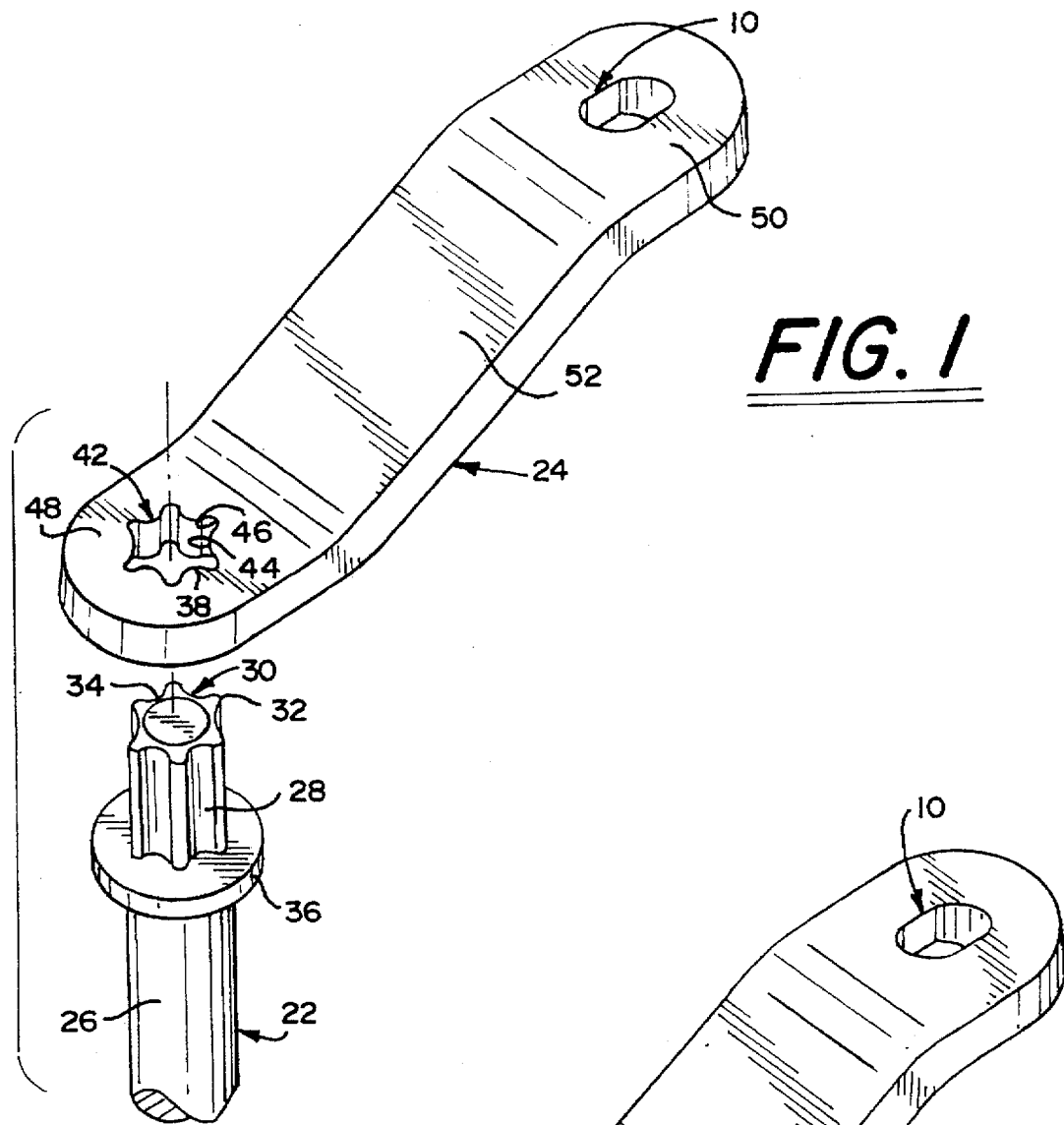
FIG. 1 is an exploded, perspective view of a stud and a plate which incorporates the features of the invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

As shown in the drawings, the present invention provides an assembly 20 which is formed from a rivet or stud 22 which is joined with a metal bracket, stamping or plate 24.

The stud 22 is joined with the plate 24 to form a connection or joint. The stud 22 is formed from a suitable material, such as carbon steel.

As shown in FIG. 1, the stud 22 includes an unthreaded shank portion 26 and a stem portion 28 which is integrally formed on and extends from one end thereof. The stem portion 28 has an external multi-lobular configuration 30 thereon comprised of a plurality of rounded lobes 32, each pair of lobes 32 being joined by a rounded flute 34. Preferably, the external multi-lobular configuration 30 is an external TORX® or TORX PLUS® shape, see U.S. Pat. Nos. 3,584,667 and 5,207,132, respectively.

A collar 36 may be provided between the stem portion 28 and the unthreaded shank portion 26 of the stud 22. If a collar 36 is provided, the collar 36 has a diameter that is greater than the diameter of the stem portion 28. If a collar 36 is not provided, the shank portion 26 of the stud 22 has a diameter which is greater than the smallest diameter of the multi-lobular stem portion 28 to form a shoulder (not shown) at the end of the shank portion 26.

The stem portion 28 of the stud 22 is inserted into and through an aperture 38 in the plate 24, such that a portion of the stem portion 28 is disposed in the aperture 38 and a portion 40 of the stem portion 28 extends upwardly from the aperture 38. An underside of the plate 24 rests on the shoulder provided by the shank portion 26 or on the collar 36 if one is provided. As also shown in FIG. 1, the aperture 38 in the plate 24 has an internal multi-lobular configuration 42, comprised of a plurality of rounded lobes 44, each pair of lobes 44 being joined by a rounded flute 46, which corresponds to the shape of the stem portion 28 and is slightly larger than the stem portion 28 of the stud 22. Thus the aperture 38 preferably has a corresponding TORX® or TORX PLUS® shape.

The plate 24 may take a variety of forms and shapes. As shown in the drawings, the plate 24 has generally planar outer end portions 48, 50 joined by an angled intermediate portion 52. The multi-lobular shaped aperture 38 is shown formed in one of the end portions 48, with the prior art double-D configuration 10 shown in the opposite end portion 50.

Figure 2:
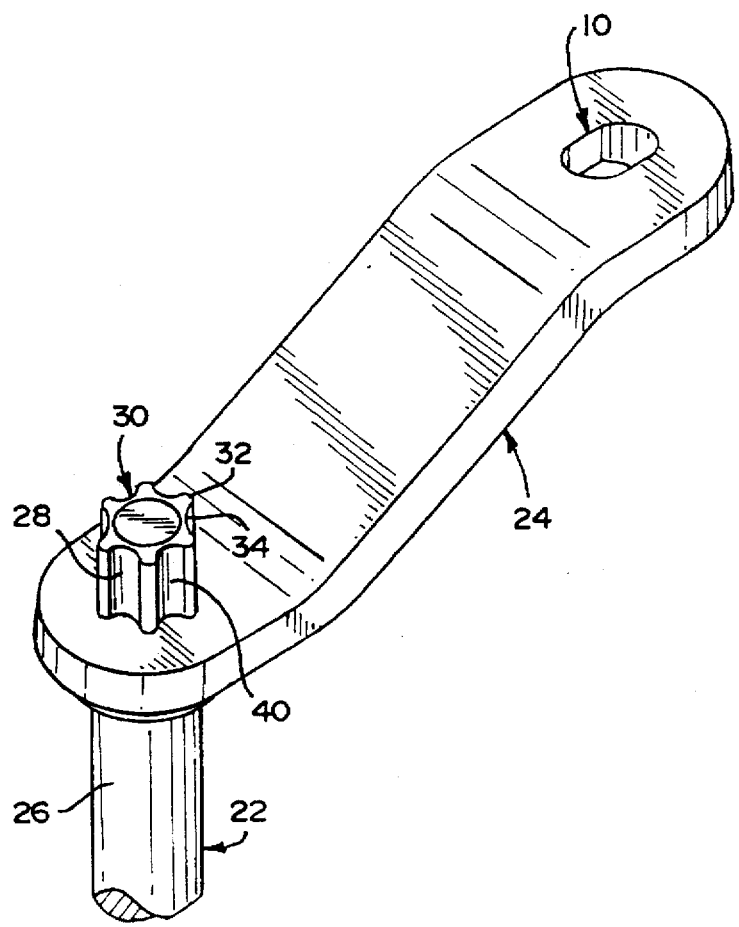
FIG. 2 is a perspective view of the stud and the plate shown in FIG. 1 in an assembled condition and prior to riveting of the stud to the plate, wherein a stem portion of the stud is inserted through an aperture in the plate.

To form the joint, the stem portion 28 of the stud 22 is inserted into and through the aperture 38 in the plate 24, as shown in FIG. 2, such that the portion 40 of the stem portion 28 extends or protrudes upwardly from the plate 24. To insert the stem portion 28 into and through the aperture 38, the lobes 32 and flutes 34 of the stem portion 28 must be respectively aligned with flutes 46 and lobes 44 of the aperture 38 in the plate 24. If the collar 36 is provided, the end portion 48 of the plate 24 will rest on top of the collar 36, otherwise, the end portion 48 will rest on the shoulder formed by the shank portion 26 of the stud 22.

Figure 3:
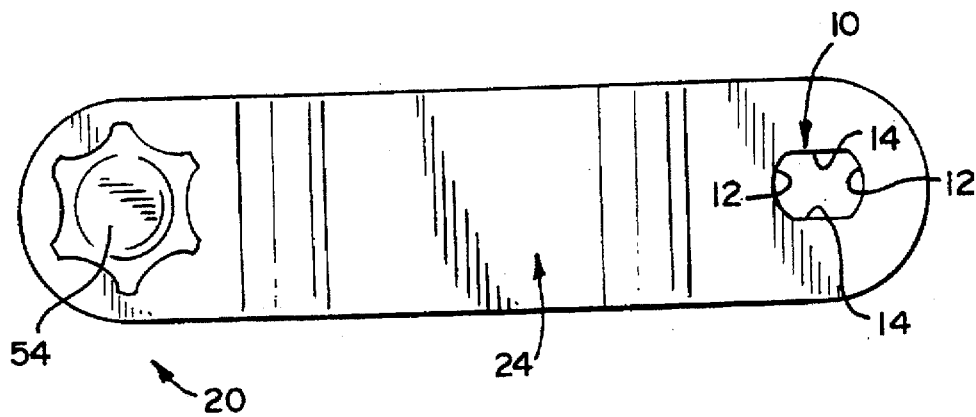
FIG. 3 is a top elevational view of the stud and the plate shown in FIG. 1 in an assembled condition and with the stem portion of the stud riveted to the plate.
Figure 4:
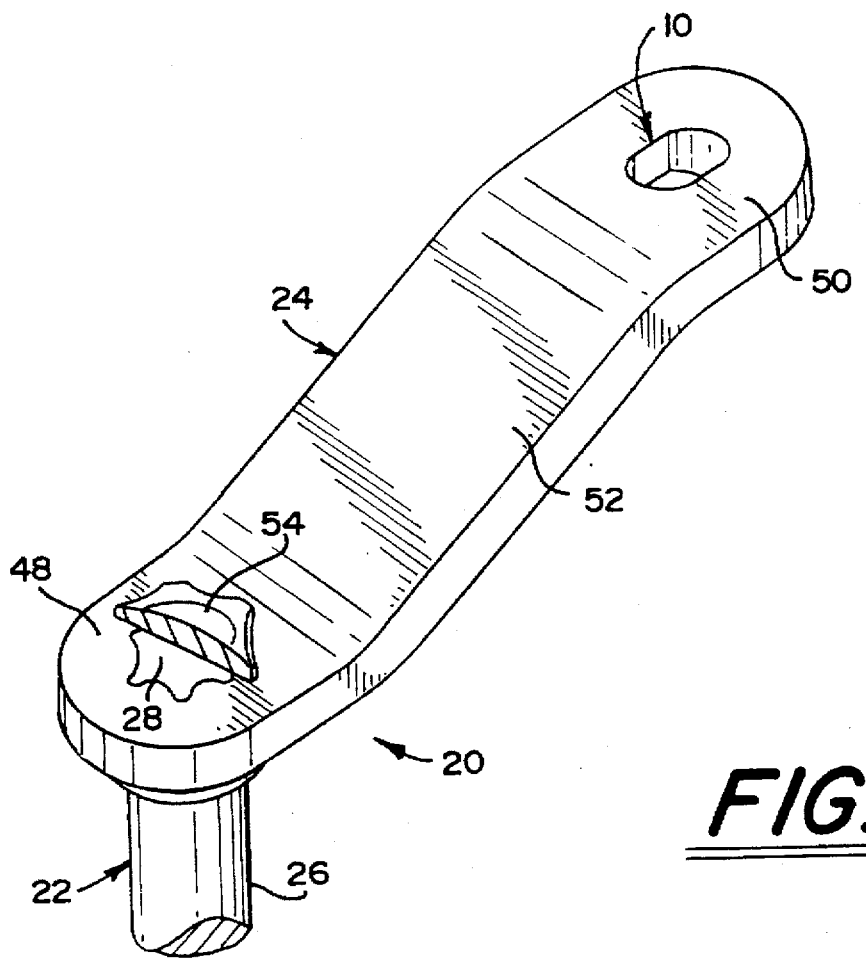
FIG. 4 is a perspective view of the stud and the plate shown in FIG. 1 in an assembled condition and with the stem portion of the stud riveted to the plate and being shown partially cut away to show the engagement of the stem portion with the aperture in the plate.

Thereafter, the extending portion 40 of the stem portion 28 is flattened and deformed by riveting to cause the extending portion 40 to expand and form a generally circular and uniform bloom or head 54 on the top surface of the plate 24, as shown in FIG. 3 and as shown partially cut away in FIG. 4, to secure the stud 22 and the plate 24 together. The plate 24 is compressively held between the head 54 and the shank portion 26 of the stud 22. During riveting, the plate 24 is uniformly supported on its underside around the periphery of the multi-lobular aperture 38 and the end of the stud 22 opposite to the stem portion 28 is supported when the axial load is placed on the stud 22 so that the stem portion 28 material within the aperture 38 expands slightly to completely fill any space between the aperture 38 and the stem portion 28. This also avoids bending of the plate 24 during riveting. The extending portion 40 is preferably radially or orbitally riveted to secure the stud 22 to the plate 24, but may be riveted by using standard riveting techniques.

With regard to radial riveting and orbital riveting, these types of riveting are now compared with the standard type of riveting, wherein a blow directed along the axis of the stud 22 is applied which will cause a portion of the stud 22 to flow outwardly. Orbital or radial riveting involves the application of an axial load, but it also employs movement of a die either by spinning or orbital movement. When radial riveting, the riveting tool follows a path which somewhat looks like a spirograph, wherein the general path thereof is radial in nature and provides a better rivet.

When the stem portion 28 of the stud 22 is riveted to secure the stud 22 to the plate 24, the employment of multi-lobular configurations 30, 42, such as a TORX® or TORX PLUS® configuration, for the stem portion 28 and for the aperture 38, respectively, provides a uniform configuration which will expand evenly for a uniform and controlled radial displacement of the stem portion material during riveting. The multi-lobular configuration 30 of the stem portion 28 approaches a round head shape during riveting for superior performance.

When the stem portion 28 expands, it completely fills the multi-lobular aperture 38 in the plate 24, because of the multi-lobular configuration 30 and the evenness and uniformity thereof, the expansion is uniform and fully fills the multi-lobular shaped aperture 38, and no voids or unfilled areas result which could lead to weakening of the resulting joint. As shown in FIG. 4, after riveting, the tolerance between the stem portion 28 and the aperture 38 is tight and gaps are not present because the uniform configuration of this design produces uniform expansion such that it is less likely to form a gap. The controlled material flow in a radial direction preloads the stresses in a more uniform manner than a double-D configuration. This reduces stress concentrations on the stem portion 28 and in the plate 24. In addition, because of uniform material flow along the thickness of the plate 24, greater torsional strength per unit thickness is provided.

The multi-lobular configurations 30, 42 of the stem portion 28 and aperture 38 provides optimized pullout resistance versus other configurations because the resulting deformed head 54 approaches a round head after riveting, whereas with a double-D configuration, a uniform bloom or deformed portion is not achieved. The more uniform the head, the more resistance there is to pull-out forces. That is to say, the present invention more closely approximates a round head than does the double-D configuration.

The multi-lobular configurations 30, 42 of the stem portion 28 and aperture 38 also provides higher pushout resistance than other designs because of the larger contact area around the periphery of the multi-lobular aperture 38. The uniform deformed head 54 provides more material in contact with the upper surface portion of the plate 24 and therefore, more material to resist push out.

The multi-lobular configuration provides for a longer fatigue life than a double-D configuration because of more uniform and lower contact stresses around the multi-lobular stem portion 28 than the double-D configuration because of greater contact area between the stud 22 and the plate 24. The peripheral surface of the multi-lobular configurations 30, 42 are greater than that of the double-D because of the lobes 32; 44 and flutes 34; 44. Thus, a greater peripheral contact is achieved between the stud 22 and the plate 24 than with a double-D stud. This tends to spread out the stress, and thereby, the stress per unit area is less with the multi-lobular stud 22 than it is with a double-D stud.

The multi-lobular configuration also provides a reduction in splitting forces in the plate 24 because of the uniform material flow and the avoidance sharp corners as occurs in double-D type configurations or other configurations, such as the one provided in U.S. Pat. No. 5,092,723 or its parent U.S. Pat. No. 4,974,274. Because the multi-lobular configurations 30, 42 do not utilize any sharp corners, i.e. all components are round, stress risers are not produced and there is less tendency to split the plate 24 or to fracture the stud 22.

The multi-lobular configuration has equivalent cross-sectional area compared to a double-D configuration, while providing a greater torsional strength and therefore is able to withstand greater torsional stresses. This results from the increased surface area in contact between the stem portion 28 and the aperture 38 using the multilobular configuration versus the double-D configuration.

When using the multi-lobular configuration of the present invention, increases stiffness of the plate 24 is provided as a result of the collar 36 (if provided), near round head 54, and larger contact area around periphery of the multi-lobular configuration. More specifically, with the double-D configuration, the overlap of the deformed head with respect to the surface of the plate is not uniform around 360°, but is primarily in the diametrically opposed cordial area. Thus, there is a tendency to bend the plate. With the present invention, deformation takes place around approximately 360°, and there is better support for the plate 24 in use and less likelihood that the plate 24 will bend.

Finally, the multi-lobular configuration of the present invention has less tendency to produce a crack with increasing hardness level because of the radiused configuration at the lobes 44 as opposed to corners with a double-D configuration or other configurations. With the double-D configuration, if a stud with a high Rockwell hardness, for example in excess of 30, is used, because of the non-uniform deformation, there is a tendency for the deformed head to crack, thereby weakening the connection or joint. With the multi-lobular configuration, since uniform deformation is achieved, it is possible to use harder materials in the fabrication of the stud 22, as there is less likelihood of producing stress cracks.

While a preferred embodiment of the present invention is shown and described, it is envisioned that those skilled in the art may devise various modifications of the present invention without departing from the spirit and scope of the appended claims.

The invention claimed is:

1. An assembly comprising: a stud having a shank portion and a stem portion extending from one end of said shank portion, said stem portion having a multi-lobular configuration thereon comprising a plurality of arcuate lobes, wherein pair of said lobes are interconnected to each other by an arcuate flute; and a plate having an aperture therethrough, said aperture having a multi-lobular configuration thereon which corresponds in shape to the multi-lobular configuration of said stem portion, wherein said stem portion is inserted through said aperture in said plate such that said stem portion having said multi-lobular configuration thereon extends beyond said plate and a portion of said stem portion having said multi-lobular configuration thereon remains within said aperture, said extending portion of said stem portion being riveted to said plate to cause said extending portion to uniformly expand and secure said stud to said plate.

2. An assembly as defined in claim 1, wherein said portion of said stem portion having said multi-lobular configuration thereon disposed within said aperture expands within said aperture to fully fill said aperture when said extending portion is being riveted to said plate.

3. An assembly as defined in claim 1, wherein said extending portion is riveted to said plate by orbital riveting.

4. An assembly as defined in claim 1, wherein said extending portion is riveted to said plate by radial riveting.

5. An assembly as defined in claim 1, wherein said extending portion is riveted to said plate by direct blow riveting.

6. An assembly as defined in claim 1, further including a collar between said shank portion and said stem portion of said stud, said stem portion having a predetermined diameter, said collar having a diameter greater than said diameter of said stem portion such that when said stem portion of said stud is inserted through said aperture in said plate, an underside of said plate contacts said collar.

7. An assembly comprising: a stud having a shank portion and a stem portion extending from one end of said shank portion, said stem portion having a multi-lobular configuration thereon; and a plate having an aperture therethrough, said aperture having a multi-lobular configuration thereon which corresponds in shape to the multi-lobular configuration of said stem portion, wherein said stem portion is inserted through said aperture in said plate such that said stem portion having said multi-lobular configutration thereon extends beyond said plate and a portion of said stem portion having said multi-lobular configuration thereon remains within said aperture, said extending portion of said stem portion being riveted to said plate to cause said extending portion to uniformly expand and secure said stud to said plate.

8. An assembly as defined in claim 7, wherein said portion of said stem portion having said multi-lobular configuration thereon disposed within said aperture expands within said aperture to fully fill said aperture when said extending portion is being riveted to said plate.

9. An assembly as defined in claim 7, wherein said extending portion is riveted to said plate by orbital riveting.

10. An assembly as defined in claim 7, wherein said extending portion is riveted to said plate by radial riveting.

11. An assembly as defined in claim 7, wherein said extending portion is riveted to said plate by direct blow riveting.

12. An assembly as defined in claim 8, further including a collar between said shank portion and said stem portion of said stud, said stem portion having a predetermined diameter, said collar having a diameter greater than said diameter of said stem portion such that when said stem portion of said stud is inserted through said aperture in said plate, an underside of said plate contacts said collar.

13. A method of forming an assembly comprising the steps of:

providing a stud having a shank portion and a stem portion extending from one end of said shank portion, said stem portion having a multi-lobular configuration thereon;

providing a plate having an aperture therethrough, said aperture having a multi-lobular configuration thereon which corresponds in shape to the multi-lobular configuration of said stem portion;

inserting said stem portion through said aperture in said plate such that said stem portion having said multi-lobular configuration thereon extends beyond said plate and a portion of said stem portion having said multi-lobular configuration thereon remains within said aperture; and riveting said extending portion of said stem portion to said plate to cause said extending portion to uniformly expand and secure said stud to said plate.

14. A method as defined in claim 13, wherein during said step of riveting said extending portion of said stem portion to said plate, said portion of said stem portion having said multi-lobular configuration thereon disposed within said aperture expands within said aperture to fully fill said aperture to prevent gaps from forming between said stem portion and said aperture.

15. A method as defined in claim 13, wherein said step of riveting is performed by orbital riveting.

16. A method as defined in claim 13, wherein said step of riveting is performed by radial riveting.

17. A method as defined in claim 13, wherein said step of riveting is performed by direct blow riveting.

18. A method as defined in claim 13, wherein said multi-lobular configuration on said stem portion comprises a plurality of arcuate lobes, wherein pairs of said lobes are interconnected to each other by an arcuate flute.

* * * * *

UNITED STATES PATENT AND TRADEMARK OFFICE
CERTIFICATE OF CORRECTION

PATENT NO. : 5,690,459
DATED : November 25, 1997
INVENTOR(S) : Steve Donovan and Frank Buchmann It is certified that error appears in the above-indentified patent and that said Letters Patent is hereby corrected as shown below:

Column 7, Line 28 "configutration" should be -- configuration --

Signed and Sealed this

Twenty-eighth Day of April, 1998

Attest:

BRUCE LEHMAN

Attesting Officer

Commissioner of Patents and Trademarks